May 6, 1930.　　　A. F. PIEPER　　　1,757,473
SYRINGE
Filed July 3, 1928　　2 Sheets-Sheet 1
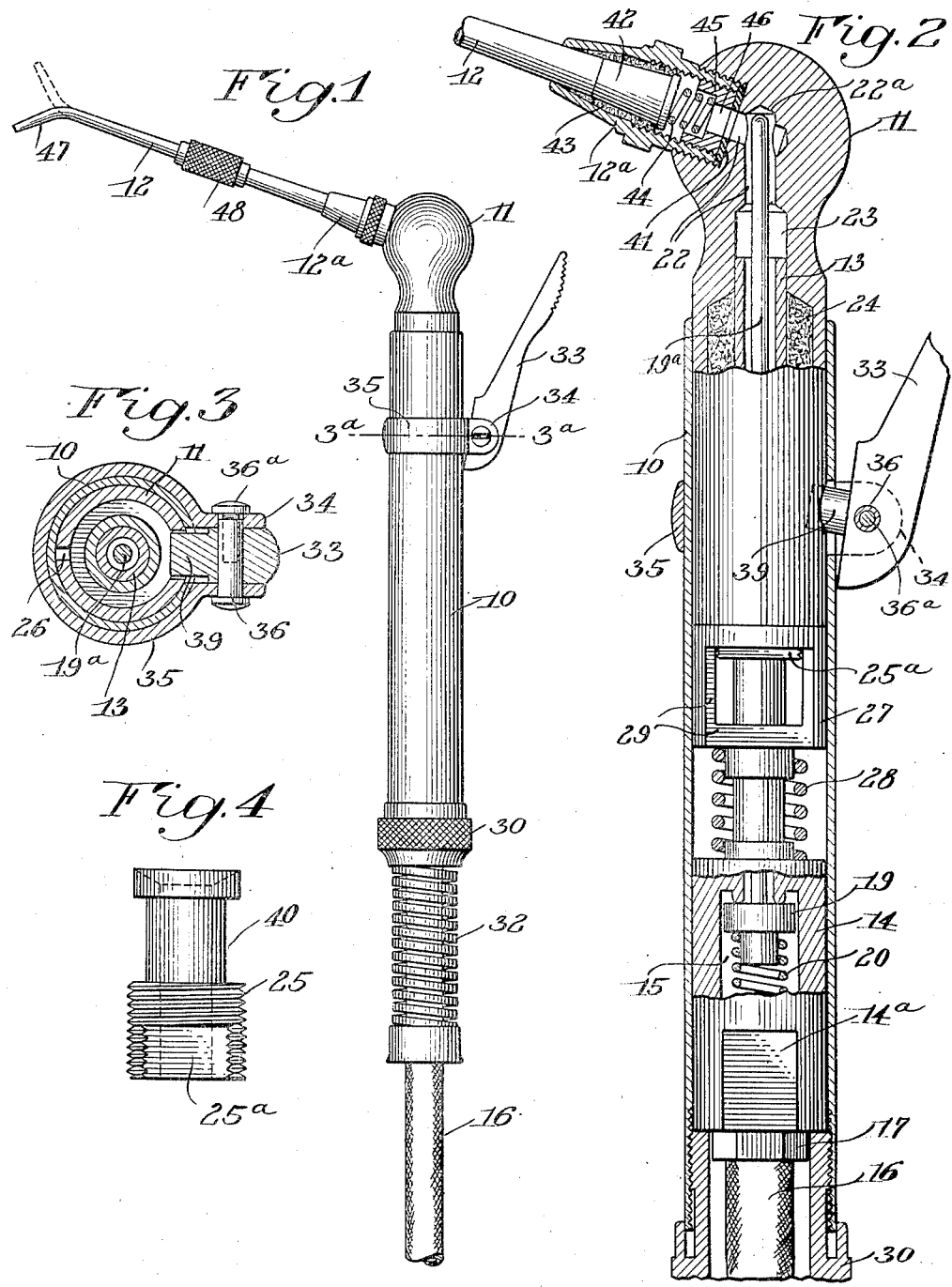
INVENTOR
Alphonse F. Pieper
BY
Cumpton & Griffith
his ATTORNEYS May 6, 1930.     A. F. PIEPER     1,757,473
SYRINGE
Filed July 3, 1928     2 Sheets-Sheet 2
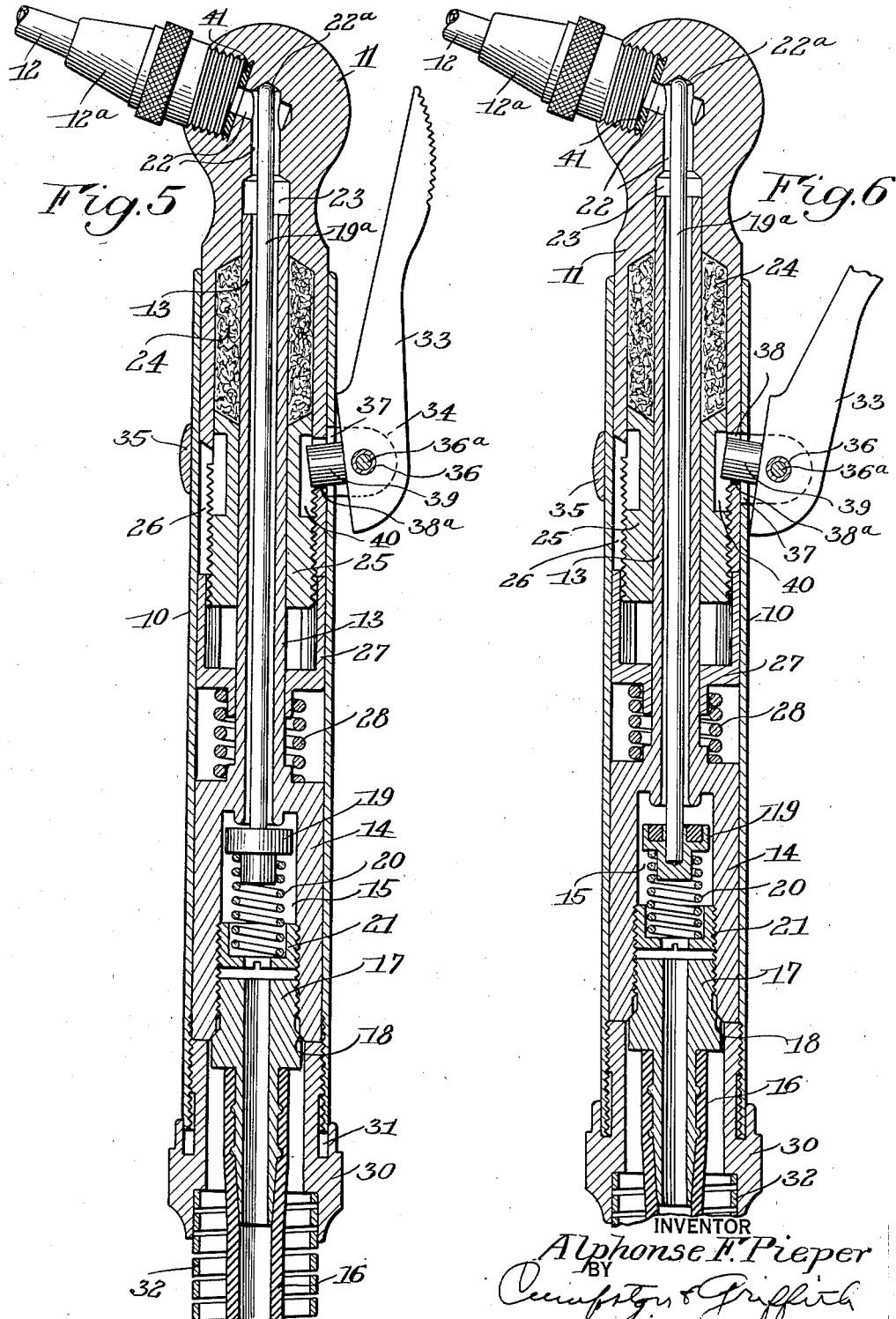
INVENTOR
Alphonse F. Pieper
BY
his ATTORNEYS Patented May 6, 1930

1,757,473

UNITED STATES PATENT OFFICE

ALPHONSE F. PIEPER, OF ROCHESTER, NEW YORK

SYRINGE

Application filed July 3, 1928. Serial No. 290,177.

The present invention relates to syringes or the like of the type particularly adapted for use by members of the dental profession. One object of the invention is to provide an improved device of this class which is compact, convenient to operate, and efficient in service.

A further object of the invention is to provide a novel and improved syringe which may be selectively controlled to permit of the usual momentary flow of the liquid or a drop by drop discharge of the same or the flow of a constant stream from the nozzle of varying capacity.
A further object of the invention is to provide a syringe of the class described with an improved nozzle construction designed in a manner to insure against a leaky joint between the nozzle and its support, while permitting rotation of the nozzle to allow its discharge end to be adjusted to varying angular positions with respect to the support.

To these and other ends the invention resides in certain improvements and combinations of parts, all as will be hereinafter more fully described, the novel features being pointed out in the claims at the end of the specification.

In the drawings:
Fig. 1 is a view of a complete syringe embodying one form of the invention;

Fig. 2 is a longitudinal part sectional view of the syringe drawn to an enlarged scale;

Fig. 3 is a transverse section taken on the line 3ª—3ª of Fig. 1;

Fig. 4 is a view in elevation of a packing support of tubular construction;

Fig. 5 is a longitudinal section through the syringe with the control valve shown in open position, and Fig. 6 is a similar section with the parts adjusted in a manner to maintain the valve in open position.

Similar reference numerals throughout the several views indicate the same parts.

The present syringe is one of a type adapted for connection with a liquid or fluid supply source under pressure, and in which the injection of the liquid is effected by the pressure in the system, such for example, as a water supply system. The syringe may be connected with either a warm or cold water supply source, as preferred. While the present device is intended for use primarily by members of the dental profession in whatever capacity it may be found advantageous in the treatment of the teeth of the patients, it is not necessarily limited to such usage and may be employed by others for the injection of fluids or liquids for whatever purpose desired. Furthermore, it is so designed as to be selectively adjustable either for a drop by drop discharge of liquid or the flow of a steady stream, as for example where it is desired to use the liquid for cooling certain instruments which become heated in use, or for the usual injections of the liquid under the control of a manually operable self-closing valve.

Referring to the drawings, 10 and 11 represent a pair of inner and outer tubular members, telescoped for longitudinal movement one relative to the other, and 12 represents a nozzle tube connected with the outer tubular member 11, by a coupling 12ª preferably as shown in Fig. 2. The tubular member 11 preferably comprises a recessed head for supporting the nozzle, the head being slidably mounted in the outer end of the member 10, comprising in the present instance a sleeve or tubular casing preferably having the function of a handle. A tube 13 is disposed within the casing and has an enlarged end 14 fitting the bore thereof and being arranged to slide therein. The enlarged end 14 is provided with a valve chamber 15 to which liquid or fluid is supplied under pressure by a conduit 16 connected with the valve chamber by a coupling 17. The coupling is preferably screwed into the portion 14 and is provided with a tapered seat 18 tightly fitting a correspondingly tapered seat on the end of said portion 14, whereby a liquid tight joint is formed between said parts. A valve 19 is disposed within the chamber 15 and normally closes the inner end of the tube 13, as shown in Fig. 2. The valve is held upon its seat by a spring 20, the inner end of which is preferably supported by a member 21 threaded within the tubular portion 14 for adjustment longitudinally therein to vary the tension on the spring, whereby to regulate the pressure required to open the valve. The head 11 is provided with an outlet 22 leading to the nozzle, the outlet being in communication with a bore 23 in which is telescoped the outer end of the tube 13 which in all positions of the head projects within the casing. The head is recessed to receive suitable packing 24 surrounding the tube 13 as shown in Fig. 5 whereby to form a liquid tight joint between the head and tube. A sleeve-like packing support 25 is slidably mounted upon the tube 13 and is threaded within the head for longitudinal movement therein to compress the packing and may be adjusted for this purpose from time to time by the use of a suitable tool such as a spanner wrench employed to engage the oppositely disposed flat surfaces 25$^a$ on the threaded end of the support, whereby to rotate it in the desired direction. The inner end portion of the head 11 is preferably split at 26 for a portion of its length so that a slight expansion thereof is permitted upon screwing the sleeve 25 therein, whereby said portion is made to engage the inner wall of the tubular casing 10 to insure a close fit between said parts.

A follower 27 is mounted within the tubular casing, being sleeved upon the tube 13, and free to slide on the inner wall of the casing with its outer end engaging the inner end of the head 11. A spring 28 is interposed between the follower and the inner end portion 14 of said tube. The spring 28 tends to urge the follower outwardly and likewise the head 11 which is normally in the position shown in Fig. 2. The follower is of tubular construction and is preferably cut away at its opposite sides to form flat surfaces 29, which with the parts in the position shown in Fig. 2, lie in the plane of the flat surfaces 25$^a$ on the sleeve 25. By cutting away the follower in this manner, a wrench may be inserted thereon to engage the opposite surfaces 25$^a$ of the sleeve 25, whereby the sleeve may be rotated within the head 11 before the parts are inserted within the tubular casing 10.

A thimble 30 is threaded into and forms a support for the tubular casing 10 and also serves as a support for the tube 13 within the casing. The thimble is provided with an annular recess 31 into which projects the inner end of the tubular casing as shown in Figs. 5 and 6. Suitably connected with the thimble is a coil spring 32 forming a guard for the hose or conduit 16 adjacent its point of connection with the syringe.

The operating means for moving the nozzle head inwardly against the resistance of the spring 28 to effect opening of the valve 19 comprises a finger lever 33 having its lower end disposed between the ends 34 of a band 35 which is preferably clamped upon the tubular handle 10 by a bolt or pin 36 forming a pivot upon which the lever is adapted to swing and including a detachable head 36$^a$ threaded into the bolt as shown in Fig. 3. At the point of connection of the band with the handle an opening 37 is cut in one side of the handle which is in registry with another opening 38 formed in the wall of the nozzle head 11. The finger lever 33 carries a lateral projection 39 extending through opening 37 into and preferably through opening 38 and also slightly into an annular groove 40 formed in the outer wall of the sleeve 25 as indicated in Figs. 5 and 6.

The valve housing 14 is provided with oppositely disposed flattened portions 14$^a$ for receiving a wrench by which it may be held or turned when screwing either the spring tensioning member 21 or the hose coupling 17 therein.

In the position at which the thimble 30 is normally adjusted, the outer end of the valve stem will be spaced a slight distance from the abutment 22$^a$ on the nozzle head as shown in Fig. 2 when the valve 19 is closed. However, as above stated the syringe is designed to afford selective control of the valve whereby it may be set at a slightly open position to permit of a drop by drop discharge of the liquid or if preferred it may be adjusted to permit of a continuous discharge of a steady stream of varying capacity. To effect such adjustment it is only necessary to hold the handle 10 and turn the thimble 30 the desired amount in a direction to cause the tube 13—14 to move outwardly within the casing 10. In doing this the outer end of the valve stem will strike the abutment 22$^a$ and upon further outward movement of the tube 13 its inner end, on which the valve is seated, will move away from the valve to effect opening of the latter. The extent to which the valve is opened will, of course, depend on the extent of the inward movement of the thimble 30 by screwing it into the casing 10. The valve will thus remain open until the thimble is again unscrewed to the proper position shown in Fig. 5, at which time the spring 28 will return the tube 13—14 to the normal position shown in this figure. In moving the tube outwardly as described the nozzle head 11 will be prevented from moving within the casing since the abutment 38$^a$ is in engagement with the part 39 of the operating lever 33 on the casing 10. The extreme position to which the valve may be opened by the adjustment just described is shown in Fig. 6, where the thimble has been screwed up to full amount within the tubular casing. Otherwise in the normal operation of the syringe for the usual momentary injection of the liquid, the thimble will be in the position shown in Fig. 2. In this position of the thimble it is only necessary, if it is desired to open the valve, to move the lever 33 inwardly to the position shown in Fig. 5, during which movement the head 11 will be moved inwardly by the portion 39 of the lever to cause the abutment 22ª to engage and move the valve stem whereby the valve will be unseated as indicated in Fig. 5. The valve may be held open as long as desired to continue the injection of the liquid or fluid into the patient's mouth. Upon release of the lever, the spring 28 will force the nozzle head outwardly thereby causing it to disengage the valve stem, thus permitting the spring 20 to seat the valve.

While the head may have any suitably constructed nozzle or outlet for the discharge of the liquid without the use of a projecting tube, I prefer to provide the latter and preferably one of the type best shown in Figs. 1 and 2. In this form of nozzle the coupling 12ª is screwed into the head and has its inner end seated on a washer 41 whereby to prevent leakage of the fluid past the threads of the coupling. The inner end of the nozzle tube 12 is provided with an enlarged tapered portion 42 which is entirely surrounded by a suitable packing 43 tightly compressed within the coupling by said tapering portion under the pressure of a spring 44 serving to urge the nozzle outwardly of the coupling. The inner end of the spring is seated upon a member 45 screwed into the coupling and having a passage 46 therethrough for establishing communication between the nozzle and outlet passage 22 of the head. The discharge end of the nozzle tube is preferably bent at an angle to the body thereof as indicated at 47 in Fig. 1, and by rotating the tube within the coupling 12ª, said end may be readily adjusted to different angular positions, as indicated for example by the full and dotted line positions shown in Fig. 1. The nozzle tube may thus be conveniently adjusted to direct the stream of fluid to any part of the mouth desired. Rotation of the nozzle can be readily effected by grasping the finger grip 48 and turning it in the desired direction, thus causing the tapered inner end 42 to rotate within the surrounding packing 43 while the spring 44 continues to urge said end into closer contact with the packing, whereby a liquid tight joint is insured under all conditions of operation.

By removing the lever 33 from the tubular casing, the nozzle head may be readily withdrawn therefrom, after which the member 25 can be screwed up to more tightly compress the packing, or said member may be removed and new packing supplied if desired.

If it is desired to vary the tension of the spring 20, the thimble 30 can be unscrewed and likewise the hose coupling 17, after which a screw driver or other suitable tool may be used to rotate the threaded spring support 21 in the required direction.

While the casing 10 and tube 13—14 are telescoped for relative movement as shown in Figs. 5 and 6, if it is preferred to effect opening of the valve only by the use of the lever 33, said tube may be fixed to the casing in the position shown in Fig. 5, or if desired it may be integral with or form a part of the casing. In other words, if it is preferred not to effect longitudinal adjustment of the tube by means of the thimble 30, the latter may be dispensed with or constructed to afford merely a connection between the guard 32 and the tubular casing 10.

I claim as my invention:

1. In combination, a syringe comprising a pair of tubular members mounted for movement one relative to the other, a nozzle carried by one of said members, the other having an inlet for fluid under pressure, a valve for controlling the passage of fluid through said members having a part normally spaced from one of the members arranged to be engaged and operated thereby upon effecting relative movement between said members and means by which said relative movement is effected.

2. In combination, a syringe comprising a pair of tubular members mounted for longitudinal movement one upon the other, a nozzle carried by one of said members, a conduit connected with the other for supplying fluid thereto under pressure and a normally closed valve for controlling the flow of fluid through said members, said valve being spaced from one of said members and opened by longitudinal movement thereof into engagement with the valve.

3. In combination, a syringe comprising a pair of tubular members mounted for longitudinal movement one relative to the other, a nozzle carried by one of said members, a normally closed valve carried by the other of said members, a conduit connected with the last mentioned member for supplying fluid thereto under pressure, and manually operable means by which to effect said relative movement.

4. In combination, a syringe comprising a pair of tubular members mounted for longitudinal movement one upon the other, a nozzle carried by one of said members, a conduit connected with the other for supplying fluid thereto under pressure, a normally closed valve for controlling the flow of fluid through said last mentioned member arranged to be automatically opened upon movement of one of said members relative to the other and an operating member pivoted upon one of said members and movable to effect longitudinal movement of the other.

5. In combination, a syringe comprising a pair of tubular members mounted for movement one relative to the other, a nozzle carried by one of said members, the other having an inlet for fluid under pressure, a valve for controlling the passage of fluid through said inlet arranged to be operated by movement of one member relative to another and an operating device pivoted upon one of said members and having a portion for engagement with the other to effect movement thereof when said device is moved to a predetermined position.

6. In combination, a syringe comprising a pair of tubular members mounted for movement one relative to the other, a nozzle carried by one of said members, the other having an inlet for fluid under pressure, a normally closed valve for controlling the passage of fluid through said inlet having a stem projecting longitudinally into one of the members and arranged to be engaged and operated by the latter upon relative movement between said members and manually operable means by which said relative movement is effected.

7. In combination, a syringe comprising a pair of tubular members mounted for longitudinal movement one relative to the other, one of said members having an outlet and the other having a fluid passage communicating therewith and a self closing valve interposed between the ends of said passage and normally preventing the flow of fluid to said outlet, said valve being automatically opened by one of said members movable relative thereto and relative to the other of said members.

8. In combination, a syringe comprising a pair of communicating tubular members mounted for longitudinal movement one relative to the other, one of said members having an outlet provided with a nozzle, a self closing valve interposed between the ends of the other of said members and normally preventing the passage of fluid therethrough, said valve being automatically opened when said members are moved one longitudinally of the other and an operating member movable upon one of the tubular members to effect longitudinal movement of the other.

9. In combination, a syringe comprising a sleeve, a tubular head mounted for movement longitudinally of the sleeve, a nozzle carried by said head, a tube within the sleeve for conveying fluid to the head and relative to which the head is movable, a valve normally closing said tube and arranged to be opened automatically upon longitudinal movement of the head and manually operable means for moving the head.

10. In combination, a syringe comprising a sleeve, a tubular head mounted for movement longitudinally of the sleeve, a nozzle carried by the head, a tube within the sleeve for conveying fluid to the head, a valve normally closing said tube and having a stem projecting therein normally spaced from and arranged to be actuated by the head whereby to open the valve upon movement of the head in one direction and means for moving the head.

11. In combination, a syringe comprising a sleeve, a tubular head movable longitudinally of the sleeve and having an outlet for fluid under pressure, a tube within the sleeve for conveying fluid to the head relative to which the head is movable, a valve normally closing the tube and means for opening the valve arranged to be actuated by the head when moved longitudinally of the sleeve.

12. In combination, a syringe comprising a sleeve, a spring-pressed tubular head movable longitudinally of the sleeve and having an outlet for fluid under pressure, a tube within the sleeve for conveying fluid to the head relative to which the head is movable, a spring-pressed valve normally closing said tube and means within the tube actuated by movement of the head to effect opening of the valve when the head is moved against the action of the spring.

13. In combination, a syringe comprising a sleeve, a tubular head mounted for longitudinal movement therein and having a fluid outlet, a tubular member within the sleeve relative to which the head is movable, said tubular member having a fluid passage leading to said outlet, spring means tending to urge said head outwardly of the sleeve, a fluid supply conduit connected with said tubular member, a valve interposed between the supply conduit and the inner end of said passage and normally closing the latter, said valve being arranged for operation by said head upon inward movement thereof against the action of said spring and means for effecting movement of the head.

14. In combination, a syringe comprising a sleeve, a tubular head mounted for longitudinal movement therein and having a fluid outlet, a tubular member within the sleeve having a fluid passage leading to said outlet, spring means tending to urge said head outwardly of the sleeve, a fluid supply conduit connected with said tubular member, a valve interposed between the supply conduit and the inner end of said passage and normally closing the latter, said valve being arranged for operation by said head upon inward movement thereof against the action of said spring, and an operating member pivoted upon the sleeve and having an inwardly projecting portion arranged when said operating member is moved in one direction to effect longitudinal movement of the head.

15. In combination, a syringe comprising a tubular member having a valve chamber in one end and a fluid passage in the other end, a tubular head sleeved upon the last mentioned end having an outlet in communication with said passage, a spring tending to urge said head outwardly, a valve in said chamber for closing the inlet end of said fluid passage, said valve having a stem projecting within said passage and arranged to be moved by said head when the latter is moved inwardly against the action of the spring whereby to open the valve, and means for effecting inward movement of the head.

16. In combination, a syringe comprising a tubular member having a valve chamber in one end and a fluid passage in the other end, a tubular head sleeved upon the last mentioned end having an outlet in communication with said passage, a spring tending to urge said head outwardly, a valve in said chamber for closing the inlet end of said fluid passage, said valve having a stem projecting within said passage and arranged to be moved by said head when the latter is moved inwardly against the action of the spring whereby to open the valve, and a manually operable member pivoted upon said tubular member having a portion arranged to cooperate with said head to move the latter inwardly against the action of said spring.

17. In combination, a syringe comprising a casing, a nozzle head slidably mounted within the casing and provided with a bore, said head having a chamber disposed inwardly of the bore, a tube within the casing projecting through said chamber into said bore, packing surrounding the tube within said chamber, a member adjustable longitudinally within the chamber adapted to compress said packing, a spring within the casing tending to urge the head outwardly thereof, a spring pressed valve normally closing said tube and having a stem projecting therethrough for movement by the head to effect opening of the valve, an operating member for the head movable upon the casing and having a portion arranged to engage the head to move it inwardly against the action of the spring and a supply conduit connected with said tube.

18. In combination, a syringe comprising a casing, a tube within the casing having an enlarged portion provided with a valve chamber and a reduced portion having a fluid passage therethrough, a tubular head slidable within the outer end of the casing having an outlet in communication with said passage, a spring interposed between the enlarged portion of the tube and the head, a fluid supply conduit connected with said valve chamber, a valve within the chamber normally closing said passage and having a stem projecting therethrough for movement by the head whereby to open the valve, a spring within said chamber for seating the valve, a member threaded within the chamber for regulating the tension of the spring and means for effecting inward movement of the head against the action of the first mentioned spring.

19. In combination, a syringe comprising a head having a fluid passage therein, a tube for conveying fluid to said passage, a valve for controlling the discharge of the fluid through said tube, a tubular nozzle support connected with said head and communicating with said passage, a nozzle tube having an inner tapered end disposed within said support, the latter having packing therein surrounding said tapered end and adapted to be compressed thereby upon urging the nozzle tube outwardly, and yieldable means serving to urge said tapered end outwardly against the resistance of said packing.

20. In combination, a syringe comprising a pair of tubular members mounted for movement one relative to the other and having communicating fluid passages therein, a nozzle carried by one of said members, a valve for controlling the flow of liquid through said passages, said valve being automatically opened upon effecting relative movement between said members, operating means by which said movement is effected and means independent of the operating means for adjusting one of said tubular members relative to the other to effect opening of the valve and serving to maintain it in open position.

21. In combination, a syringe comprising a tubular casing and a nozzle head carried thereby, a tube movable within the casing and arranged to deliver fluid to the nozzle head, a supply conduit connected with the tube, a valve normally preventing the passage of fluid through the tube and arranged to be opened automatically upon effecting relative movement between the casing and said tube and operating means adjustable to effect such movement.

22. In combination, a syringe comprising a tubular casing and a nozzle head movable one relative to the other, a tube movable longitudinally within the casing and arranged to deliver fluid to the nozzle head, a supply conduit connected with the tube, a valve for closing the tube arranged to be opened automatically upon effecting relative movement between the casing and nozzle head and also arranged to be opened automatically upon movement of the tube longitudinally within the casing, means for effecting relative movement between the casing and nozzle head and independent means for moving the tube within the casing to effect opening of the valve.

23. In combination, a syringe comprising a pair of telescoped tubes arranged for relative longitudinal movement and having fluid passages therein, a discharge nozzle on the outer tube, a fluid supply conduit connected with the inner tube and a valve for controlling the passage of the fluid through the inner tube to the nozzle arranged to be automatically opened upon effecting relative longitudinal movement between said tubes.

24. In combination, a syringe comprising inner and outer tubes mounted for relative longitudinal movement and having communicating passages for the flow of liquid under pressure, a valve arranged to be opened by a longitudinal movement thereof upon effecting relative movement between said tubes whereby to permit the liquid to flow from one to the other, a nozzle carried by the outer tube and means movable upon one of the tubes arranged to effect movement of the other.

25. In combination, a syringe comprising a pair of telescoped inner and outer tubes, the latter of which is movable longitudinally of the former, a nozzle on the outer tube, a valve normally closing the inner tube, a member adjustable to move the inner tube to effect opening of the valve, and a fluid supply conduit leading to the inner tube through said adjustable member.

ALPHONSE F. PIEPER.